United States Patent
Okada et al.

(10) Patent No.: US 11,279,261 B2
(45) Date of Patent: Mar. 22, 2022

(54) VEHICULAR SEAT ADJUSTMENT DEVICE, POSITION ADJUSTMENT CONTROL DEVICE, AND VEHICULAR SEAT ADJUSTMENT METHOD

(71) Applicants: AISIN SEIKI KABUSHIKI KAISHA, Kariya (JP); TOYOTA JIDOSHA KABUSHIKI KAISHA, Toyota (JP)

(72) Inventors: Takashi Okada, Kariya (JP); Soichiro Hozumi, Nishio (JP); Shunsuke Tanaka, Nisshin (JP); Shinichiro Komaki, Toyota (JP)

(73) Assignees: AISIN SEIKI KABUSHIKI KAISHA, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 531 days.

(21) Appl. No.: 16/323,367

(22) PCT Filed: Jul. 26, 2017

(86) PCT No.: PCT/JP2017/027030
§ 371 (c)(1),
(2) Date: Feb. 5, 2019

(87) PCT Pub. No.: WO2018/034121
PCT Pub. Date: Feb. 22, 2018

(65) Prior Publication Data
US 2021/0291700 A1    Sep. 23, 2021

(30) Foreign Application Priority Data
Aug. 15, 2016    (JP) .............................. JP2016-159270

(51) Int. Cl.
*B60N 2/04*    (2006.01)
*B60N 2/02*    (2006.01)
*B60N 2/16*    (2006.01)

(52) U.S. Cl.
CPC ........... *B60N 2/045* (2013.01); *B60N 2/0232* (2013.01); *B60N 2/1615* (2013.01); *B60N 2/1635* (2013.01)

(58) Field of Classification Search
CPC .... B60N 2/0232; B60N 2/045; B60N 2/1615; B60N 2/1635
See application file for complete search history.

(56) References Cited

U.S. PATENT DOCUMENTS 8,038,217 B2 * 10/2011 Yamagishi ........... B60N 2/3013
                                                    297/341
2004/0135411 A1 * 7/2004 Hensley ............... B60N 2/1853
                                                    297/313

(Continued)

FOREIGN PATENT DOCUMENTS

| EP | 0639477 A1 * | 2/1995 | ........... B60N 2/1635 |
| JP | 2014-159220 A | 9/2014 | |
| JP | 2015-91680 A | 5/2015 | |

OTHER PUBLICATIONS

International Search Report dated Oct. 10, 2017 in PCT/JP2017/027030 filed on Jul. 26, 2017.

*Primary Examiner* — James M Ference
(74) *Attorney, Agent, or Firm* — Oblon, McClelland, Maier & Neustadt, L.L.P.

(57) ABSTRACT

A vehicle seat adjustment device includes a first adjustment mechanism, a second adjustment mechanism, and a controller. The first adjustment mechanism is moved in a first direction upon driving of a first motor to adjust a position of a vehicle seat. The second adjustment mechanism is moved in both the first direction and a second direction orthogonal to the first direction upon driving of a second motor to adjust the position of the vehicle seat. The controller controls and drives the first motor and the second motor. A speed at which the second adjustment mechanism is moved in the first (Continued)

direction is lower than or equal to a speed at which the first adjustment mechanism is moved in the first direction. When the second motor needs to be driven, the controller drives the second motor while driving the first motor.

7 Claims, 4 Drawing Sheets

(56) References Cited

U.S. PATENT DOCUMENTS

| | | | |
|---|---|---|---|
| 2008/0284362 A1* | 11/2008 | Buhlheller | B60N 2/0244 318/434 |
| 2010/0066137 A1* | 3/2010 | Sakai | B60N 2/0228 297/217.3 |
| 2012/0226418 A1* | 9/2012 | Veen | B60N 2/0276 701/49 |
| 2013/0154534 A1* | 6/2013 | Okada | G05D 3/20 318/490 |
| 2013/0253779 A1* | 9/2013 | Fujii | B60N 2/919 701/49 |
| 2014/0097657 A1* | 4/2014 | Hozumi | B60N 2/06 297/344.1 |
| 2015/0130240 A1* | 5/2015 | Hozumi | B60N 2/0244 297/340 |
| 2016/0325642 A1* | 11/2016 | Fitzpatrick | B60N 2/1615 |
| 2019/0126781 A1* | 5/2019 | Okada | B60N 2/0232 |

* cited by examiner

VEHICULAR SEAT ADJUSTMENT DEVICE, POSITION ADJUSTMENT CONTROL DEVICE, AND VEHICULAR SEAT ADJUSTMENT METHOD

TECHNICAL FIELD

The present invention relates to a vehicle seat adjustment device, a position adjustment control device, and a vehicle seat adjustment method.

BACKGROUND ART

A known vehicle seat adjustment device includes a slide mechanism that adjusts the front-rear position of the seat relative to the vehicle floor and a lift mechanism that adjusts the vertical position of the seat relative to the vehicle floor to provide a drive position or a relax position desired by a vehicle occupant.

A seat adjustment device of patent document 1 includes a slide motor arranged in a slide mechanism, a lift motor arranged in a lift mechanism, and a controller that controls the motors. The controller calculates a rotation amount required for the slide motor and the lift motor (required rotation amount) from the difference between a present seat position and a target seat positon. Further, the controller calculates a required time for a sliding action (estimated sliding time) and a required time for a lifting action (estimated lifting time) from rotation speeds of the slide motor and the lift motor, which are detected from pulses or the like, and the required rotation amount of each motor. Then, the controller compares the estimated sliding time and the estimated lifting time and controls and drives the motors to reduce the rotation speed of the lift motor when the estimated sliding time is greater and reduce the rotation speed of the slide motor when the estimated lifting time is greater.

PRIOR ART LITERATURE

Patent Literature

Patent Document 1: Japanese Laid-Open Patent Publication No. 2014-159220

SUMMARY OF THE INVENTION

Problem to be Solved by the Invention

The lift mechanism of patent document 1 includes a support member that rotates about a portion coupled to the vehicle floor. The lift mechanism is configured to change the vertical positon of the seat when the support member is rotated. The rotation of the support member includes movement in a front-rear direction. Accordingly, when adjusting the seat in a vertical direction, the seat also moves in the front-rear direction. This may be annoying to a vehicle occupant when changing the seat position.

One object of this invention is to provide a vehicle seat adjustment device that will not be annoying in the manner described above when changing the seat position.

Means for Solving the Problem

A vehicle seat adjustment device that achieves the above objective includes a first adjustment mechanism, a second adjustment mechanism, and a controller. The first adjustment mechanism is moved in a first direction upon driving of a first motor to adjust a position of a vehicle seat. The second adjustment mechanism is moved in both the first direction and a second direction orthogonal to the first direction upon driving of a second motor to adjust the position of the vehicle seat. The controller controls and drives the first motor and the second motor. If a speed at which the second adjustment mechanism is moved in the first direction is lower than or equal to a speed at which the first adjustment mechanism is moved in the first direction when the second motor needs to be driven, the controller drives the second motor while driving the first motor.

A position adjustment control device according to another mode moves a vehicle seat to a first position and a second position by controlling actuation of a first adjustment mechanism moved in a first direction upon driving of a first motor to adjust a position of the vehicle seat and actuation of a second adjustment mechanism moved in the first direction and a second direction orthogonal to the first direction upon driving of a second motor to adjust the position of the vehicle seat. The position adjustment control device includes a controller. The controller sets a speed at which the second adjustment mechanism is moved in the first direction to be lower than or equal to a speed at which the first adjustment mechanism is moved in the first direction. Further, the controller drives the second motor while driving the first motor when the second motor needs to be driven.

A vehicle seat adjustment method according to a further mode includes adjusting a position of a vehicle seat by moving a first adjustment mechanism in a first direction upon driving of a first motor, adjusting the position of the vehicle seat by moving a second adjustment mechanism in the first direction and a second direction orthogonal to the first direction upon driving of a second motor, setting a speed at which the second adjustment mechanism is moved in the first direction upon driving of the second motor to be lower than or equal to a speed at which the first adjustment mechanism is moved in the first direction upon driving of the first motor, and driving the second motor while the first motor is being driven when the second motor needs to be driven.

With this configuration, while both of the first adjustment mechanism and the second adjustment mechanism adjust the position of the vehicle seat, the vehicle seat is only moved toward a one side in the first direction toward which the vehicle seat is adjusted by the first adjustment mechanism if the speed at which the vehicle seat is moved by the first adjustment mechanism is higher than the speed at which the vehicle seat is moved by the second adjustment mechanism. Further, if the speed at which the vehicle seat is moved by the first adjustment mechanism is set to be the same as the speed at which the vehicle seat is moved by the second adjustment mechanism, the position of the vehicle seat in the first direction is maintained. Accordingly, a vehicle occupant is less likely to feel annoyed when moving the vehicle seat.

With the above configuration, it is preferred that the controller stops driving the second motor before stopping driving of the first motor.

With this configuration, the position of the vehicle seat would not be adjusted only by the second motor. Thus, the vehicle seat is moved toward a one side in the first direction toward which the vehicle seat is adjusted by the first adjustment mechanism, or the position of the vehicle seat in the first direction is maintained. Thus, the vehicle occupant is less likely to feel annoyed when moving the vehicle seat.

With the above configuration, it is preferred that when moving the vehicle seat from a present position toward a target position that is a position after the vehicle seat is moved, the controller adjusts driving speeds of the first motor and the second motor so that driving of the first motor and the second motor starts at the same time and ends at the same time.

With this configuration, the vehicle seat is moved only toward a one side in the first direction thereby the vehicle occupant is less likely to feel annoyed when moving the vehicle seat.

With the above configuration, it is preferred that the second adjustment mechanism includes a rotation member rotated about a fulcrum to move the vehicle seat in the first direction and the second direction, and the controller drives the first motor when a speed at which the vehicle seat moves in the first direction exceeds a speed at which the vehicle seat moves in the second direction.

With this configuration, the first motor is driven when the vehicle occupant is likely to feel the movement of the vehicle seat in the first direction by the second adjustment mechanism. Accordingly, the vehicle seat is moved toward a one side toward which the vehicle seat is adjusted by the first adjustment mechanism, or the position of the vehicle seat in the first direction is maintained. Thus, the vehicle occupant is less likely to feel annoyed when moving the vehicle seat.

With the above configuration, it is preferred that the controller drives the second motor while driving the first motor when the first adjustment mechanism adjusts the seat toward a side opposite to a side toward which the second adjustment mechanism adjusts the seat.

Simultaneous actuation of the first motor and the second motor when the first adjustment mechanism adjusts the seat toward a side opposite to a side toward which the second adjustment mechanism adjusts the seat is effective for reducing the annoying feel.

With the above configuration, it is preferred that the controller calculates a drive time required by the second motor to move the vehicle seat from a present position to a target position that is a position after the vehicle seat is moved, drives the first motor for a longer time than or equal to a drive time of the second motor in a state in which the second motor is stopped, and then starts driving the second motor.

With this configuration, when the vehicle seat is moved from the present position to the target position, a movement path does not move toward the side opposite to the target position from the present position. Accordingly, when moving the vehicle seat, the vehicle occupant is less likely to feel annoyed by a feel as if the seat is returning to the side opposite to the target position.

Effects of the Invention

The vehicle seat adjustment device of the present invention is less likely to be annoying when changing the seat position.

EMBODIMENTS OF THE INVENTION

A vehicle seat adjustment device in accordance with one embodiment will now be described with reference to drawings.

Figure 1:
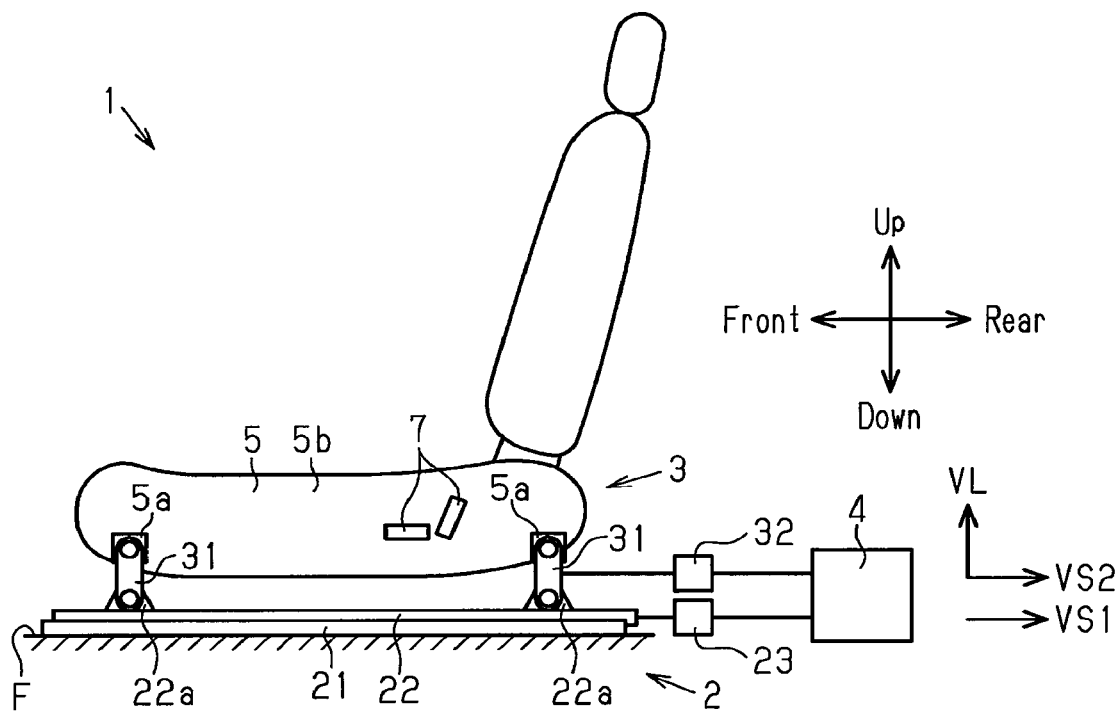
FIG. 1 is a partially schematic side view of a vehicle seat adjustment device.

As shown in FIG. 1, a vehicle seat adjustment device 1 includes a slide adjustment mechanism 2, a lift adjustment mechanism 3, a control device 4, and a seat 5.

The slide adjustment mechanism 2 includes a lower rail 21, an upper rail 22, and a slide motor 23. The lower rail 21 is arranged on a vehicle floor F and extends in a front-rear direction of the vehicle. The upper rail 22 extends in the front-rear direction and slides along the lower rail 21. The slide motor 23 serves as a first motor that generates a driving force to slide the upper rail 22 along the lower rail 21. A known transmission unit (not shown) is arranged between the slide motor 23 and the upper rail 22 to convert the rotation motion of the slide motor 23 into a linear motion of the upper rail 22 relative to the lower rail 21.

The upper rail 22 has an upper portion including two coupling portions 22a that are spaced apart in the front-rear direction. Each coupling portion 22a is coupled to the seat 5 by a lift link 31, which will be described later. Accordingly, when the slide motor 23 is driven, a slide position, which is the position of the seat 5 in the front-rear direction, is adjusted. When the slide motor 23 is driven, the seat 5 moves in the front-rear direction at a first sliding speed VS1. The slide adjustment mechanism 2 corresponds to a first adjustment mechanism, and the front-rear direction corresponds to a first direction.

The lift adjustment mechanism 3 includes the lift links 31 and a lift motor 32. Each lift link 31 is pivotally supported by the corresponding one of the two coupling portions 22a. The lift motor 32 serves as a second motor that generates a driving force to pivot the lift link 31. The lift link 31 includes a first end that is pivotally supported by the coupling portion 22a and a second end at an opposite side of the first end. The second end is pivotally supported by a coupling portion 5a that is arranged at a lower portion of the seat 5. The lift link 31 corresponds to a rotation member.

A known reduction gear (not shown) is arranged between the lift motor 32 and the lift link 31 to reduce the rotation of the lift motor 32 and transmit the rotation to the lift link 31. Accordingly, when the lift motor 32 is driven, a lift position, which is the position of the seat 5 in a vertical direction, is adjusted.

Figure 2:
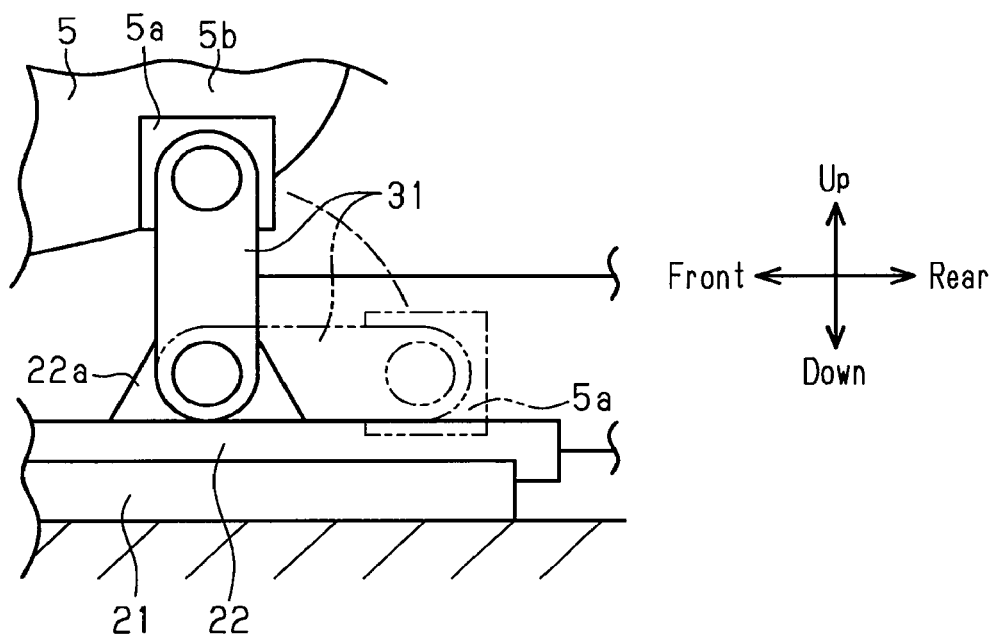
FIG. 2 is an enlarged view of a portion around a lift link in FIG. 1.

The lift adjustment mechanism 3 in the present embodiment is configured to lift and lower the seat 5 by pivoting the lift links 31. Thus, as shown in FIG. 2, when lifting or lowering the seat 5, the seat 5 (coupling portions 5a) also moves in the front-rear direction. When the lift motor 32 is driven, the seat 5 moves in the front-rear direction at a second sliding speed VS2, which is lower than the first sliding speed VS1, and in the vertical direction at a lifting speed VL. The lift adjustment mechanism 3 corresponds to a second adjustment mechanism and the vertical direction corresponds to a second direction.

When lifting the seat 5 by pivoting the lift links 31, the seat 5 is moved forward and upward. When lowering the seat 5 by pivoting the lift links 31, the seat 5 is moved rearward and downward.

Figure 3:
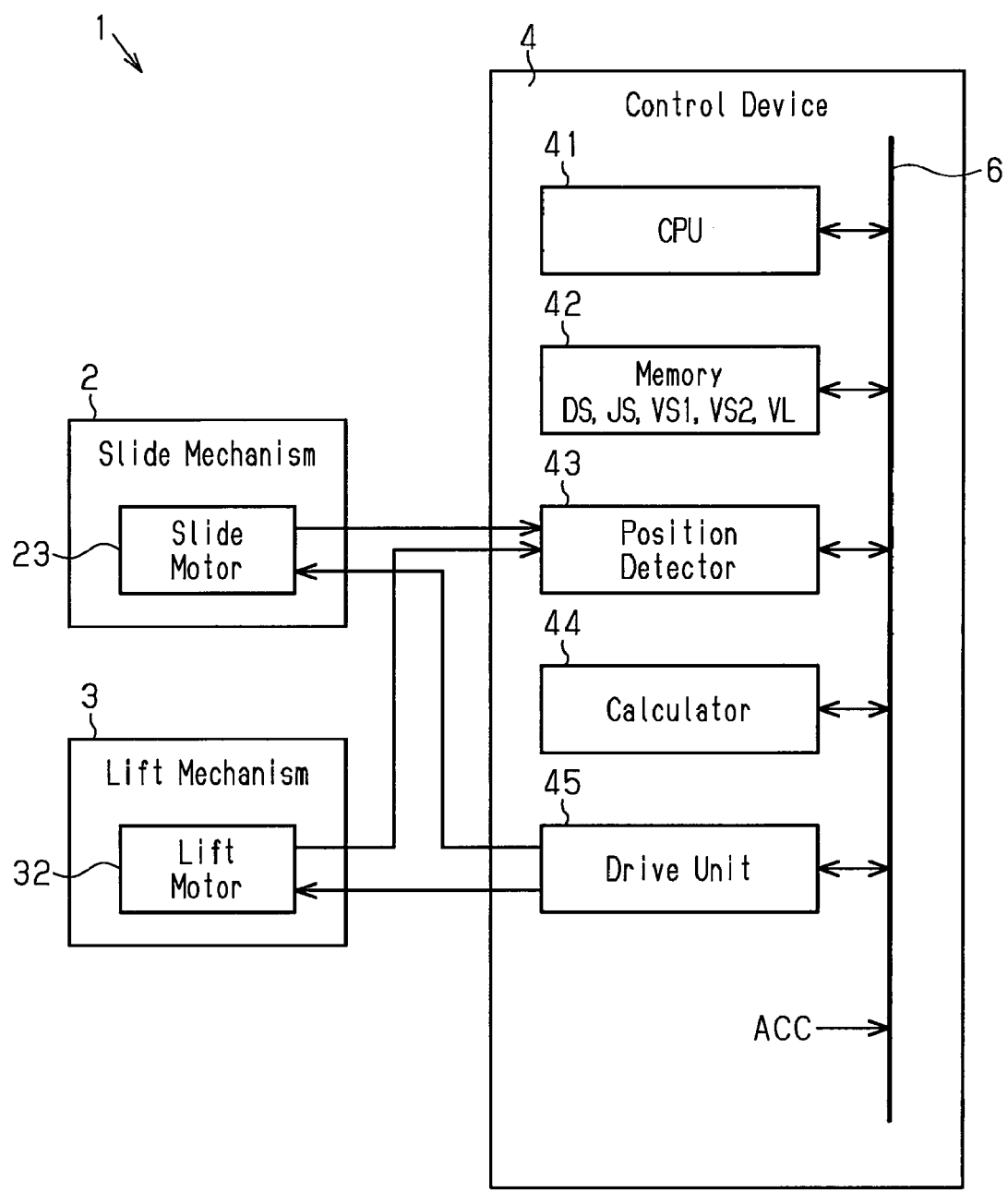
FIG. 3 is a schematic block diagram showing the configuration of the vehicle seat adjustment device.

As shown in FIG. 3, a control device 4 includes a CPU 41, a memory 42, a position detector 43, a calculator 44, and a drive unit 45. These components are connected with one another by a bus 6. Further, the bus 6 is connected to an accessory switch (ACC) that switches in-vehicle electric components on and off. The control device 4 corresponds to a controller and a position adjustment control device.

The CPU 41 is a processor that controls the transfer of electric signals between the components of the control device 4.

Figure 4:
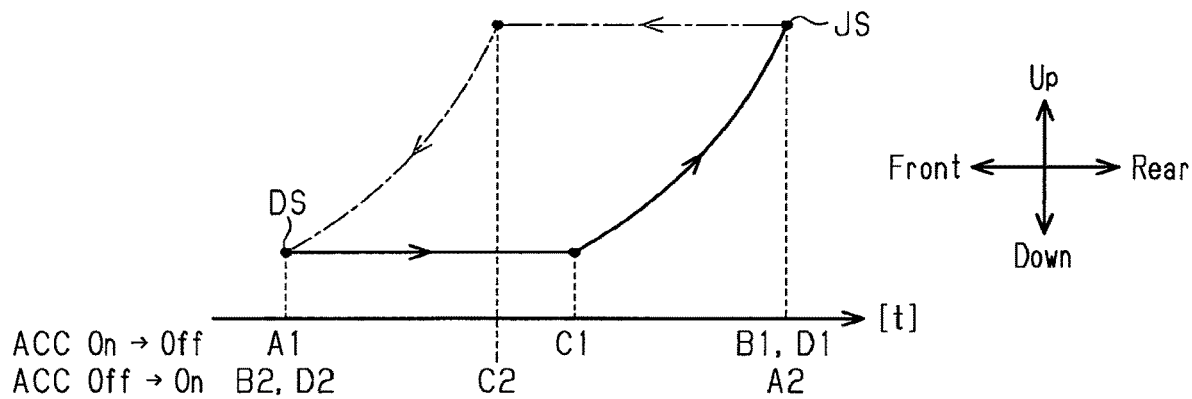
FIG. 4 is a timing chart showing a movement path of a center of mass of a seat and timings when motors are driven.
Figure 5:
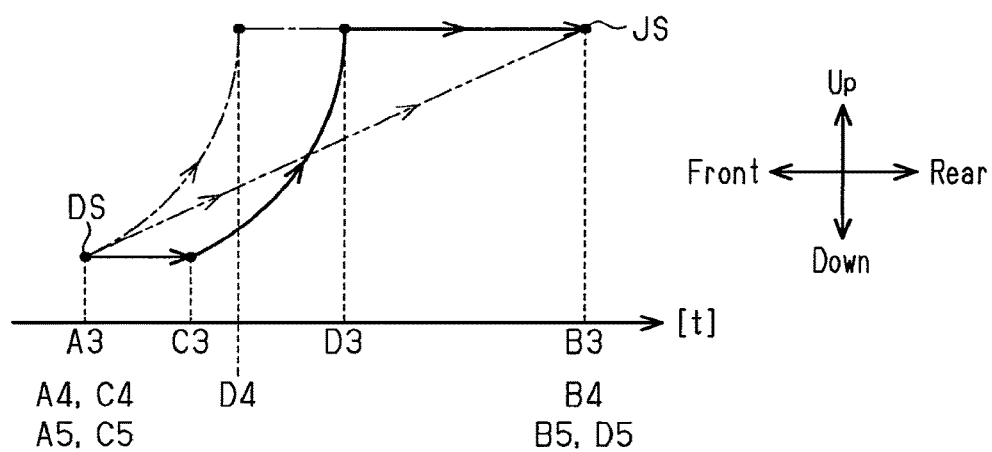
FIG. 5 is a timing chart showing a movement path of a center of mass of a seat and timings when motors are driven in accordance with another embodiment.
Figure 6:
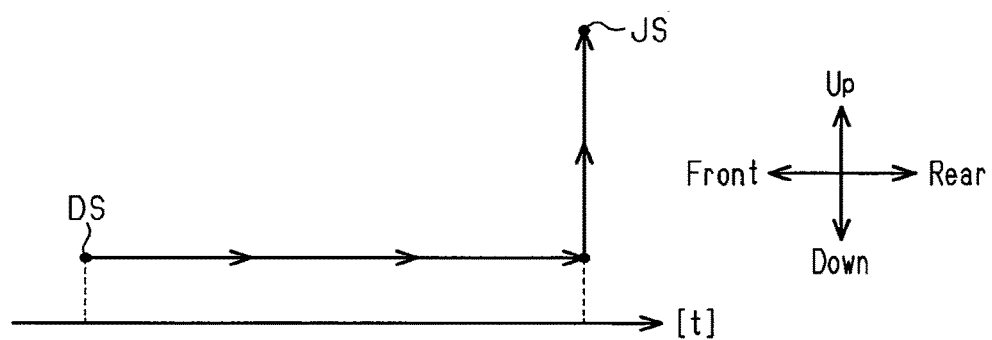
FIG. 6 is a timing chart showing a movement path of a center of mass of a seat and timings when motors are driven in accordance with a further embodiment.

The memory 42 stores, in addition to control programs of the CPU 41, rotation speeds of the slide motor 23 and the lift motor 32 that indicate a driving seat positon DS (refer to FIGS. 4 to 6) and an enter-exit seat position JS (refer to FIGS. 4 to 6).

The driving seat position DS is a seat position for when a driver drives, and the enter-exit seat positon JS is a seat position for when a driver enters or exits the vehicle. The driving seat position DS and the enter-exit seat position JS are set in advance but may be adjusted by, for example, operating position adjustment switches 7 (refer to FIG. 1) arranged beside (in widthwise direction of vehicle) a seat cushion 5b of the seat 5. As shown in FIG. 4, the driving seat position DS of the present embodiment is forward from and below the enter-exit seat position JS. The enter-exit seat position JS is the rearmost and uppermost position in the vehicle.

The memory 42 stores the first sliding speed VS1, the second sliding speed VS2, and the lifting speed VL.

The position detector 43 detects the present slide position of the seat 5 from rotation pulses of the slide motor 23 and detects the present lift position of the seat 5 from rotation pulses of the lift motor 32.

When the accessory switch is switched on or off, the calculator 44 calculates a slide motor drive time and a lift motor drive time required to move the seat 5 from the present position to a target position (driving seat position DS or enter-exit seat position JS).

More specifically, when the accessory switch is switched from on to off, the calculator 44 sets the target position to the enter-exit seat position JS and calculates the slide motor drive time and the lift motor drive time. Further, when the accessory switch is switched from off to on, the calculator 44 sets the target position to the driving seat position DS and calculates the slide motor drive time and the lift motor drive time.

The drive unit 45 controls and drives the slide motor 23 and the lift motor 32 based on the calculation results of the calculator 44. More specifically, the drive unit 45 controls and drives the slide motor 23 and the lift motor 32 so that a point in time when the lift motor 32 starts driving is between a point in time when the slide motor 23 starts driving and a point in time when the slide motor 23 stops driving. Further, the drive unit 45 controls and drives the slide motor 23 and the lift motor 32 so that the point in time when the slide motor 23 stops driving matches a point in time when the lift motor 32 stops driving.

The operation of the vehicle seat adjustment device 1 will now be described.

First, the operation of the vehicle seat adjustment device 1 when the accessory switch (ACC) is switched from on to off, that is, when the seat 5 is moved from the driving seat position DS to the enter-exit seat position JS will be described.

When moving the seat 5 from the driving seat position DS to the enter-exit seat position JS, the seat 5 is moved rearward by the slide adjustment mechanism 2 as well as forward and upward by the lift adjustment mechanism 3. That is, a seat adjustment direction of the slide adjustment mechanism 2 is opposite to a seat adjustment direction of the lift adjustment mechanism 3 in the front-rear direction.

As shown in FIG. 4, based on the obtained slide motor drive time, the drive unit 45 sets point in time A1 for when the driving of the slide motor 23 starts and point in time B1 for when the driving of the slide motor 23 stops. Subsequently, based on the obtained lift motor drive time, the drive unit 45 sets point in time C1 for when the driving of the lift motor 32 starts and point in time D1 for when the driving of the lift motor 32 stops so that point in time C1 is between point in time A1 and point in time B1 and so that point in time D1 matches point in time B1. Then, the drive unit 45 controls and drives the slide motor 23 and the lift motor 32 based on the set points in time A1, B1, C1, and D1.

The process for moving the seat 5 from the driving seat position DS to the enter-exit seat position JS shown in FIG. 4 will now be described. First, when the accessory switch (ACC) is switched from on to off, the slide adjustment mechanism 2 starts moving rearward at the first sliding speed VS1 (point in time A1). Then, the lift adjustment mechanism 3 starts a lifting action at point in time C1, which is set by the drive unit 45, when the driving of the lift motor 32 starts. In this case, the lift adjustment mechanism 3 starts moving forward at the second sliding speed VS2 and upward at the lifting speed VL. When the seat 5 reaches the enter-exit seat position JS, the slide adjustment mechanism 2 and the lift adjustment mechanism 3 stop simultaneously (points in time B1 and D1).

The slide adjustment mechanism 2 and the lift adjustment mechanism 3 are configured to be simultaneously driven from point in time C1 to points in time B1 and D1. While the lift adjustment mechanism 3 moves forward at the second sliding speed VS2 during the lifting, the slide adjustment mechanism 2 moves rearward at the first sliding speed VS1. When the second sliding speed VS2 is set to be lower than the first sliding speed VS1, the seat 5 moves rearward at a speed obtained by subtracting the second sliding speed VS2 from the first sliding speed VS1. In this manner, the seat 5 moves rearward and does not move forward. Thus, from point in time C1 to points in time B1 and D1, the seat 5 moves rearward at a speed obtained by subtracting the second sliding speed VS2 from the first sliding speed VS1 and upward at the lifting speed VL.

Accordingly, as shown by the solid lines in FIG. 4, when the seat 5 moves from the driving seat position DS to the enter-exit seat position JS, a movement path of a center of mass of the seat 5 extends rearward and upward without even temporarily moving forward or downward.

The operation of the vehicle seat adjustment device 1 when the accessory switch is switched from off to on, that is, when the seat 5 is moved from the enter-exit seat position JS to the driving seat position DS will now be described.

In this case, as shown in FIG. 4, based on the obtained slide motor drive time, the drive unit 45 sets point in time A2 for when the driving of the slide motor 23 starts and point in time B2 for when the driving of the slide motor 23 stops. Subsequently, based on the obtained lift motor drive time, the drive unit 45 sets point in time C2 for when the driving of the lift motor 32 starts and point in time D2 for when the driving of the lift motor 32 stops so that point in time C2 is between point in time A2 and point in time B2 and so that point in time B2 matches point in time D2. Then, the drive unit 45 controls and drives the slide motor 23 and the lift motor 32 based on the set points in time A2, B2, C2, and D2.

The process for changing the seat 5 from the enter-exit seat position JS to the driving seat position DS shown in FIG. 4 will now be described. First, when the accessory switch (ACC) is switched from on to off, the slide adjustment mechanism 2 starts moving forward at the first sliding speed VS1 (point in time A2). Then, the lift adjustment mechanism 3 starts a lowering action at point in time C2, which is set by the drive unit 45, when the driving of the lift motor 32 starts. In this case, the lift adjustment mechanism 3 starts moving rearward at the second sliding speed VS2 and downward at the lifting speed VL. When the seat 5 reaches the driving seat position DS, the slide adjustment mechanism 2 and the lift adjustment mechanism 3 stop simultaneously (points in time B2 and D2).

The slide adjustment mechanism 2 and the lift adjustment mechanism 3 are configured to be simultaneously driven from point in time C2 to points in time B2 and D2. More specifically, while the lift adjustment mechanism 3 moves rearward at the second sliding speed VS2 during the lowering action, the slide adjustment mechanism 2 moves forward at the first sliding speed VS1. In this case, when the second sliding speed VS2 is set to be lower than the first sliding speed VS1, the seat 5 moves forward at a speed obtained by subtracting the second sliding speed VS2 from the first sliding speed VS1. In this manner, the seat 5 moves forward and does not move rearward. Thus, from point in time C2 to points in time B2 and D2, the seat 5 moves forward at a speed obtained by subtracting the second sliding speed VS2 from the first sliding speed VS1 and downward at the lifting speed VL.

Accordingly, as shown by the dashed lines in FIG. 4, when the seat 5 moves from the enter-exit seat position JS to the driving seat position DS, a movement path of a center of mass of the seat 5 extends forward and downward without even temporarily moving rearward or upward.

As described above, when a target position of the seat 5 is rearward from and above the present position, the seat 5 does not move forward or downward. Further, when a target position of the seat 5 is forward from and below the present position, the seat 5 does not move rearward or upward. Accordingly, the seat 5 does not move in a movement direction that differs from the movement action of the seat 5 intended by the user sitting on the seat 5. Thus, the user will not feel annoyed.

The above embodiment may be modified as described below.

In the above embodiment, the drive unit 45 controls and drives the slide motor 23 and the lift motor 32 so that points in time C1 and C2 for when the driving of the lift motor 32 starts is included from points in time A1 and A2 for when the driving of the slide motor 23 starts to points in time B1 and B2 for when the driving of the slide motor 23 stops. Further, the drive unit 45 controls and drives the slide motor 23 and the lift motor 32 so that points in time B1 and B2 for when the driving of the slide motor 23 stops match points in time D1 and D2 for when the driving of the lift motor 32 stops. However, such a configuration may be modified as described below.

As shown by the solid lines in FIG. 5, the drive unit 45 may control and drive the motors 23 and 32 so that point in time C3 for when the driving of the lift motor 32 starts and point in time D3 for when the driving of the lift motor 32 stops are both between point in time A3 for when the driving of the slide motor 23 starts and point in time B3 for when the driving of the slide motor 23 stops.

Preferably, a period from point in time A3 for when the driving of the slide motor 23 starts and point in time C3 for when the driving of the lift motor 32 starts is longer than or equal to the lift motor drive time calculated by the calculator 44.

In this case, the seat 5 is moved rearward by the slide motor 23 before the lift motor 32 starts driving. Accordingly, even when the seat 5 is moved forward by the drive of the lift motor 32, the seat 5 does not move forward because the seat 5 is moved further rearward than an amount moved forward by the driving of the lift motor 32.

The drive of the lift motor 32 moves the seat forward. However, the forward movement amount is less than a rearward movement amount of the seat 5 when the slide motor 23 is driven for the same time.

Thus, with such a control, even if the driving of the slide motor 23 is stopped while the lift motor 32 is being driven, a movement path of the seat 5 does not move forward beyond the present position. In other words, the movement path of the seat 5 does not move toward the opposite side of the target position from the present position. Accordingly, when changing the vehicle seat position, the vehicle occupant is less likely to be annoyed by a feel as if the seat is returning to the side opposite to the target position.

Further, as shown by the dashed lines in FIG. 5, the drive unit 45 may match point in time A4 for when the driving of the slide motor 23 starts and point in time C4 for when the driving of the lift motor 32 starts. In addition, the drive unit 45 may control and drive the motors 23 and 32 so that point in time D4 for when the driving of the lift motor 32 stops is between point in time A4 for when the driving of the slide motor 23 starts to point in time B4 for when the driving of the slide motor 23 stops.

With such a configurations, the same advantages as the above embodiment can also be obtained.

In the above embodiment, the seat 5 is moved at a constant speed by driving the slide motor 23 and the lift motor 32. However, the driving speeds of the motors 23 and 32 may be changed.

In the above embodiment, when the seat 5 moves from the driving seat position DS to the enter-exit seat position JS, the lift motor drive time is shorter than the slide motor drive time. Instead, for example, the motors 23 and 32 may be adjusted so that the driving speeds are the same. In this case, as shown by the double-dashed line in FIG. 5, point in time A5 for when the driving of the slide motor 23 starts matches point in time C5 when for the driving of the lift motor 32 starts, and point in time B5 for when the driving of the slide motor 23 stops matches point in time D5 for when the driving of the lift motor 32 stops.

When the seat 5 moves from the driving seat position DS to the enter-exit seat position JS, the slide motor 23 and the lift motor 32 are simultaneously started and stopped. In this case, from point in time A5 (C5) to point in time B5 (D5) shown in FIG. 5, the seat 5 is moved forward by the lift adjustment mechanism 3 at the second sliding speed VS2. Further, the seat 5 is moved rearward by the slide adjustment mechanism 2 at the first sliding speed VS1. When the second sliding speed VS2 is set to be lower than the first sliding speed VS1, the seat 5 moves rearward at a speed obtained by subtracting the second sliding speed VS2 from the first sliding speed VS1. Further, from point in time A5 (C5) to point in time B5 (D5), the seat 5 is moved upward by the lift adjustment mechanism 3 at the lifting speed VL. Accordingly, from point in time A5 (C5) to point in time B5 (D5), the seat 5 is moved rearward and upward by the slide adjustment mechanism 2 and the lift adjustment mechanism 3 simultaneously. In this case, when the seat 5 moves rearward and upward simultaneously, the direction in which the seat 5 is moved does not change during the movement. Thus, the movement path of the seat 5 extends in a straight line or in an arc.

With such a configuration, the seat 5 moves in a single direction from the driving seat position DS toward the enter-exit seat position JS. Thus, a vehicle occupant is less likely to feel annoyed when changing the position of the seat 5. When the seat 5 linearly moves from the driving seat position DS toward the enter-exit seat position JS, a vehicle occupant is further less likely to feel annoyed.

As shown in FIG. 5, the distance between the driving seat position DS and the enter-exit seat position JS in the front-rear direction is greater than that in the vertical direction. Accordingly, when point in time A5 matches point in time C5, and point in time B5 matches point in time D5, the moving speed of the seat 5 in the front-rear direction is higher than the moving speed of the seat 5 in the vertical direction.

In the above embodiment, the movement speed at which the seat 5 is moved by the lift adjustment mechanism 3 in the front-rear direction is lower than the movement speed at which the seat 5 is moved by the slide adjustment mechanism 2 in the front-rear direction. However, the speeds may be set to be equal.

A process through which the seat 5 is moved from the driving seat position DS to the enter-exit seat position JS when the movement speed at which the seat 5 is moved by the lift adjustment mechanism 3 in the front-rear direction is the same as the movement speed at which the seat 5 is moved by the slide adjustment mechanism 2 in the front-rear direction will now be described with reference to FIG. 6. First, the seat 5 is moved rearward by the slide motor 23. After the seat 5 is positioned below the enter-exit seat position JS, the slide motor 23 and the lift motor 32 are both driven. In this case, the seat 5 is moved forward and upward by the lift adjustment mechanism 3 and rearward by the slide adjustment mechanism 2. The position of the seat 5 in a sliding direction is maintained since the movement speed at which the seat is moved 5 by the lift adjustment mechanism 3 in the front-rear direction is the same as the movement speed at which the seat 5 is moved by the slide adjustment mechanism 2 in the front-rear direction. Thus, the seat 5 only moves upward. The seat 5 does not move forward. Thus, the vehicle occupant is less likely to feel annoyed.

When the lift adjustment mechanism 3 of the above embodiment is employed, the seat 5 moves in the vertical direction when the lift link 31 is rotated. Even when the lift link 31 is rotated at a constant rotation speed V, the lifting resulting from the rotation changes the relationship between the second sliding speed VS2, which is the movement speed at which the seat 5 is moved by the lift adjustment mechanism 3 in the sliding direction, and the lifting speed VL, which is the movement speed at which the seat 5 is moved by the lift adjustment mechanism 3 in a lifting direction, in correspondence with a rotation position of the lift link 31.

Figure 7:
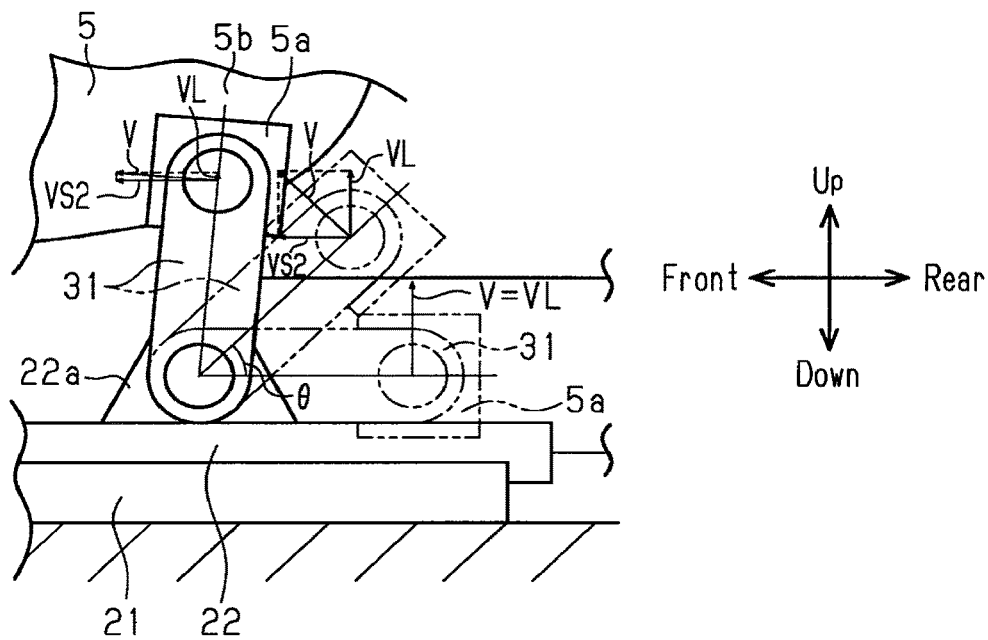
FIG. 7 is an enlarged view of a portion around the lift link showing the relationship of the rotation speed of the lift link with a second sliding speed and a lifting speed.

When lifted, as shown in FIG. 7, if an angle θ between the lift link 31 and the upper rail 22 is less than 45°, the lifting speed VL is higher than the second sliding speed VS2. Further, if the angle θ is greater than 45°, the second sliding speed VS2 is higher than the lifting speed VL. Accordingly, when the angle θ is greater than 45°, a vehicle occupant is more likely to feel the forward movement of the seat 5 and may thus feel annoyed.

In this respect, when the forward movement of the seat 5 is likely to be felt, the drive unit 45 drives the slide motor 23. This moves the seat 5 in the sliding direction of the slide adjustment mechanism 2 so that the vehicle occupant is less likely to be annoyed when feeling the forward movement of the seat 5.

In the present embodiment, a case where the second sliding speed VS2 is higher than the lifting speed VL is exemplified as a case where a vehicle occupant is likely to feel the forward movement of the seat 5. However, when a vehicle occupant is likely to feel the forward movement of the seat 5 is not limited to the above situation. For example, if experiments or the like show that a vehicle occupant is likely to feel the forward movement of the seat 5 when the second sliding speed VS2 is higher than or equal to a specified value, it is preferred that the drive unit 45 determine whether or not to perform a control based on the specified value.

Preferably, such a control is employed when the movement amount of the seat 5 from the present position to the target position in the sliding direction is small.

In the above embodiment, with the vehicle seat adjustment device 1, when lifting the seat 5, the seat 5 is moved forward in the sliding direction and upward by the structure of the lift adjustment mechanism 3. More specifically, the adjustment direction in which the seat 5 is moved by the lift adjustment mechanism 3 in the sliding direction (forward in sliding direction) is opposite to the adjustment direction in which the seat 5 is moved by the slide adjustment mechanism 2 in the sliding direction (rearward in sliding direction). Accordingly, when the seat 5 is moved from the driving seat position DS to the enter-exit seat position JS, the seat 5 may be moved in a direction opposite to the sliding direction in which the seat 5 moves from the driving seat position DS to the enter-exit seat position JS when the moving speed of the lift adjustment mechanism 3 in the sliding direction is higher than the moving speed of the slide adjustment mechanism 2 in the sliding direction. This indicates the significance of the timing when the slide motor 23 and the lift motor 32 are driven and the moving speeds of the lift adjustment mechanism 3 and the slide adjustment mechanism 2 in the sliding direction.

Depending on a position of a vehicle door or the like, the enter-exit seat position JS may be located forward and upward from the present position (for example, driving seat position DS).

In such a case, when moving the seat 5 from the driving seat position DS to the enter-exit seat position JS, the adjustment direction in which the seat 5 is moved by the lift adjustment mechanism 3 in the sliding direction (forward in sliding direction) is the same as the adjustment direction in which the seat 5 is moved by the slide adjustment mechanism 2 in the sliding direction (forward in sliding direction). Accordingly, even when the slide motor 23 is driven at a point in time differing from a point in time when the lift motor 32 is driven, the seat 5 constantly moves forward. This reduces the annoying feel when adjusting the seat 5.

In other words, when the adjustment direction in which the seat 5 is moved by the lift adjustment mechanism 3 in the sliding direction is opposite to the adjustment direction in which the seat 5 is moved by the slide adjustment mechanism 2 in the sliding direction, execution of the control in the above embodiment is highly effective for reducing annoyance that the vehicle occupant feels.

The employment of the vehicle seat adjustment device 1 of the above embodiment is not limited to a driver seat and may be employed to a passenger seat and a back seat.

The configuration in the control device 4 of the above embodiment may be modified. For example, the position detector 43 and the calculator 44 may be part of a common component, and the calculator 44 and the drive unit 45 may be part of a common component.

The seat 5 may be configured to move rearward and upward when lifting the seat 5 with the lift adjustment mechanism 3.

In this case, when moving the seat 5 from the driving seat position DS to the enter-exit seat position JS, the seat 5 is moved rearward and upward by the lift adjustment mechanism 3 and rearward by the slide adjustment mechanism 2. That is, the seat 5 is moved in the same direction as the sliding direction by the lift adjustment mechanism 3 and the slide adjustment mechanism 2. Accordingly, when adjusting the position of the seat 5 by both the slide adjustment mechanism 2 and the lift adjustment mechanism 3, the seat 5 only moves in the sliding direction in which the slide adjustment mechanism 2 moves. In this case, the seat 5 moves in the sliding direction in which the slide adjustment mechanism 2 moves at a speed obtained by adding the first sliding speed VS1 and the second sliding speed VS2.

In the above embodiment, the position of the seat 5 is adjusted when the accessory switch is switched on or off. However, the position of the seat 5 may be adjusted, for example, when the engine is switched on or off, a door is opened or closed, or when a dedicated switch for seat position adjustment is switched on or off.

DESCRIPTION OF REFERENCE CHARACTERS 1) vehicle seat adjustment device; 2) slide adjustment mechanism (first adjustment mechanism); 3) lift adjustment mechanism (second adjustment mechanism); 4) control device (controller, position adjustment control device); 5) seat; 5a) coupling portion; 5b) seat cushion; 6) bus; 7) position adjustment switch; 21) lower rail; 22) upper rail; 22a) coupling portion; 23) slide motor (first motor); 31) lift link (rotation member); 32) lift motor (second motor); 41) CPU; 42) memory; 43) position detector; 44) calculator; 45) drive unit

The invention claimed is:

1. A vehicle seat adjustment device, comprising:
   a first adjustment mechanism moved in a first direction upon driving of a first motor to adjust a position of a vehicle seat;
   a second adjustment mechanism moved in both the first direction and a second direction orthogonal to the first direction upon driving of a second motor to adjust the position of the vehicle seat; and
   a controller that controls and drives the first motor and the second motor, wherein if a speed at which the second adjustment mechanism is moved in the first direction is lower than or equal to a speed at which the first adjustment mechanism is moved in the first direction when the second motor is activated, the controller drives the second motor while driving the first motor,
   wherein the second adjustment mechanism includes a rotation member rotated about a fulcrum to move the vehicle seat in the first direction and the second direction, and
   wherein the controller drives the first motor when a speed at which the vehicle seat moves in the first direction exceeds a speed at which the vehicle seat moves in the second direction.

2. The vehicle seat adjustment device according to claim 1, wherein the controller stops driving the second motor before stopping driving of the first motor.

3. The vehicle seat adjustment device according to claim 1, wherein when moving the vehicle seat from a first position toward a target position that is a position after the vehicle seat is moved, the controller adjusts driving speeds of the first motor and the second motor so that driving of the first motor and the second motor starts at a same start time and ends at a same end time.

4. The vehicle seat adjustment device according to claim 1, wherein the controller drives the second motor while driving the first motor when the first adjustment mechanism adjusts the seat toward a side opposite to a side toward which the second adjustment mechanism adjusts the seat.

5. A vehicle seat adjustment device, comprising:
   a first adjustment mechanism moved in a first direction upon driving of a first motor to adjust a position of a vehicle seat;
   a second adjustment mechanism moved in both the first direction and a second direction orthogonal to the first direction upon driving of a second motor to adjust the position of the vehicle seat; and
   a controller that controls and drives the first motor and the second motor, wherein if a speed at which the second adjustment mechanism is moved in the first direction is lower than or equal to a speed at which the first adjustment mechanism is moved in the first direction when the second motor is activated, the controller drives the second motor while driving the first motor,
   wherein the controller calculates a drive time required by the second motor to move the vehicle seat from a first position to a target position that is a position after the vehicle seat is moved, drives the first motor for a longer time than or equal to a drive time of the second motor in a state in which the second motor is stopped, and then starts driving the second motor.

6. A position adjustment control device that moves a vehicle seat to a first position and a second position by controlling actuation of a first adjustment mechanism moved in a first direction upon driving of a first motor to adjust a position of the vehicle seat and actuation of a second adjustment mechanism moved in the first direction and a second direction orthogonal to the first direction upon driving of a second motor to adjust the position of the vehicle seat, the position adjustment control device comprising:
   a controller, wherein
   the controller sets a speed at which the second adjustment mechanism is moved in the first direction to be lower than or equal to a speed at which the first adjustment mechanism is moved in the first direction, and
   the controller drives the second motor while driving the first motor when the second motor is activated,
   wherein the second adjustment mechanism includes a rotation member rotated about a fulcrum to move the vehicle seat in the first direction and the second direction, and
   wherein the controller drives the first motor when a speed at which the vehicle seat moves in the first direction exceeds a speed at which the vehicle seat moves in the second direction.

7. A method for adjusting a vehicle seat, the method comprising:

adjusting a position of a vehicle seat by moving a first adjustment mechanism in a first direction upon driving of a first motor,
adjusting the position of the vehicle seat by moving a second adjustment mechanism in the first direction and a second direction orthogonal to the first direction upon driving of a second motor,
setting a speed at which the second adjustment mechanism is moved in the first direction upon driving of the second motor to be lower than or equal to a speed at which the first adjustment mechanism is moved in the first direction upon driving of the first motor, and
driving the second motor while the first motor is being driven when the second motor is activated,
wherein the second adjustment mechanism includes a rotation member rotated about a fulcrum to move the vehicle seat in the first direction and the second direction, and
wherein the controller drives the first motor when a speed at which the vehicle seat moves in the first direction exceeds a speed at which the vehicle seat moves in the second direction.

* * * * *